L. A. KRAMER.
HOG DEHAIRING AND SCRAPING MACHINE.
APPLICATION FILED JAN. 2, 1919.
1,325,893.
Patented Dec. 23, 1919.
7 SHEETS—SHEET 1.
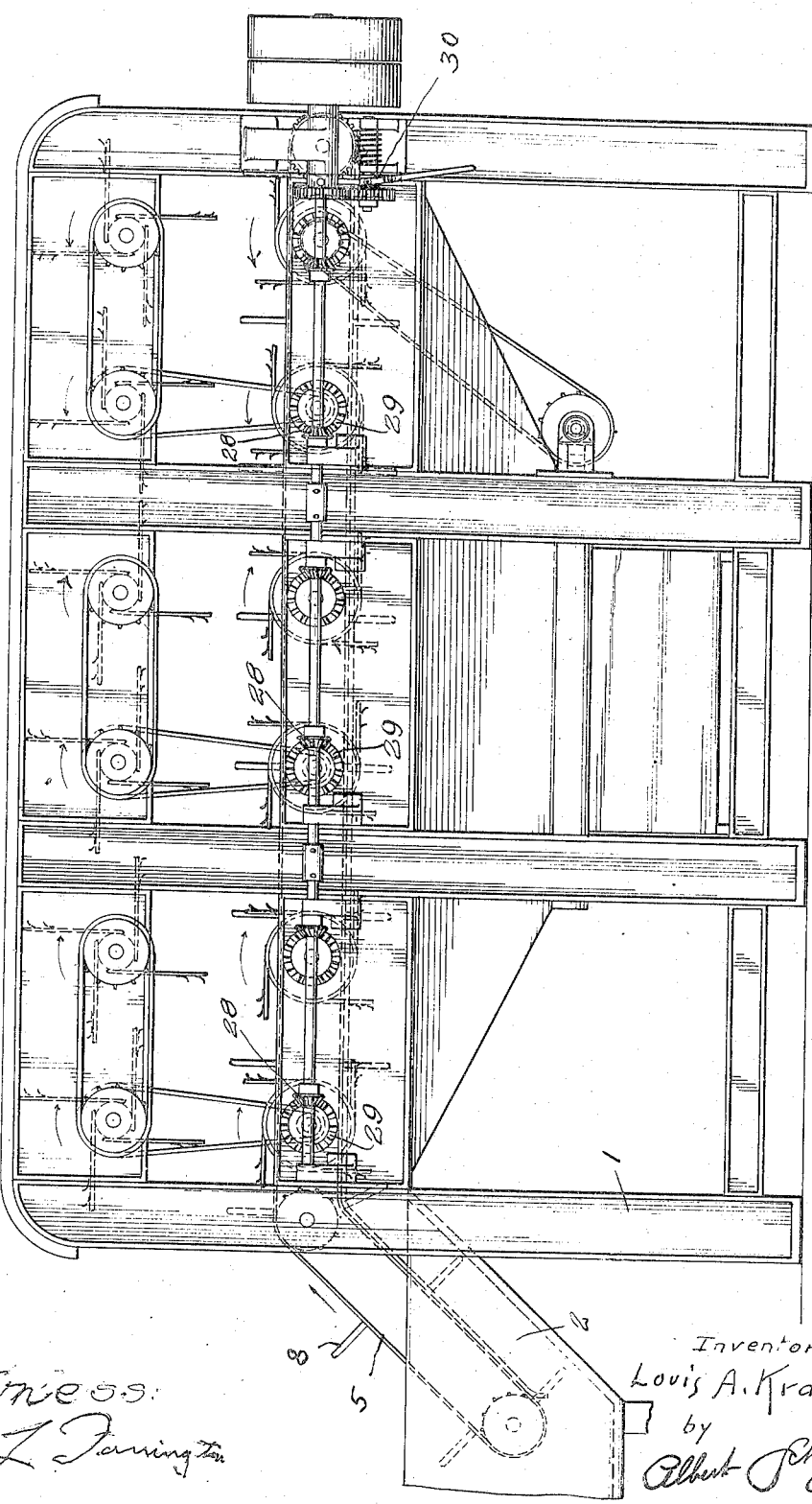

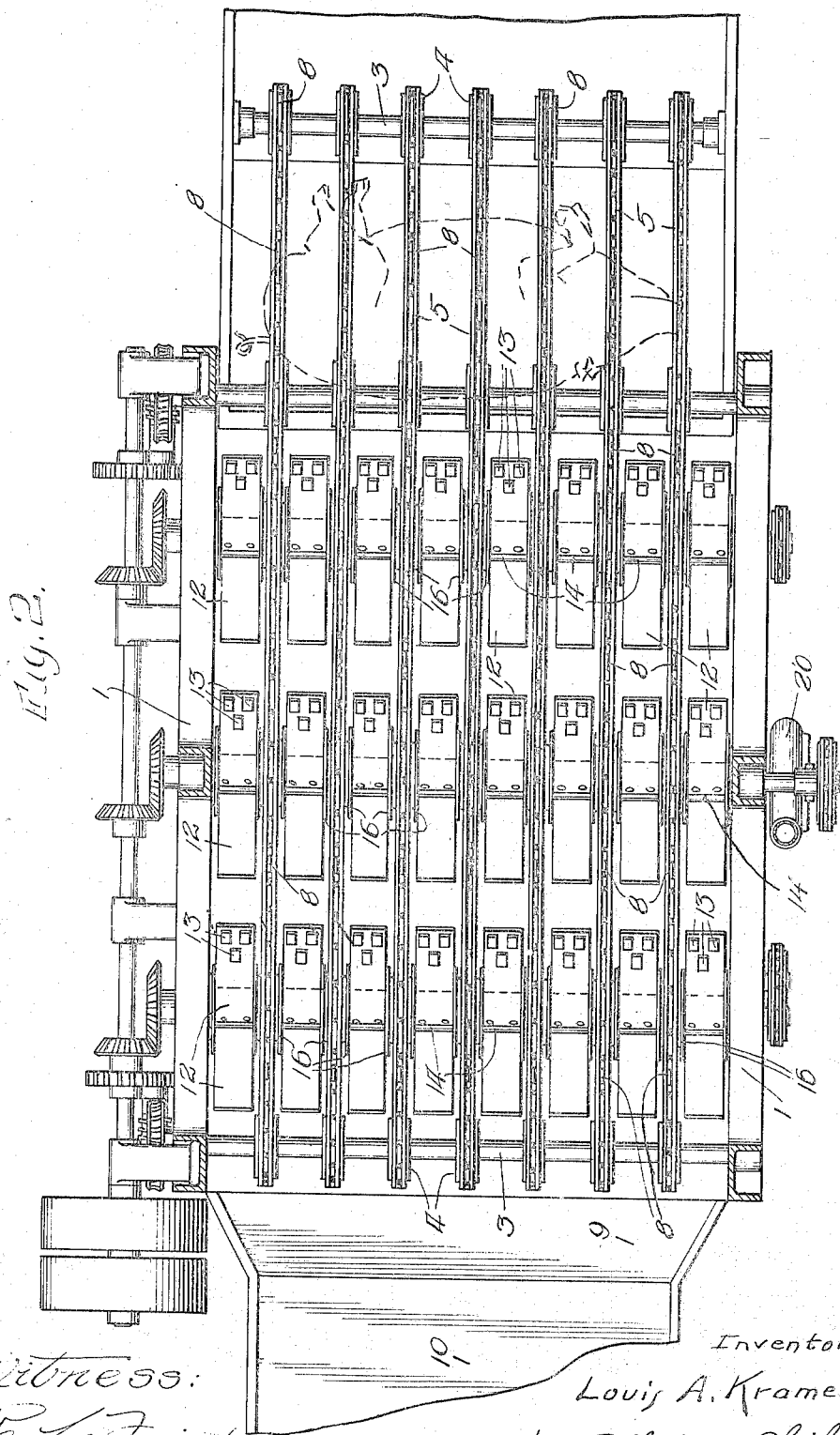

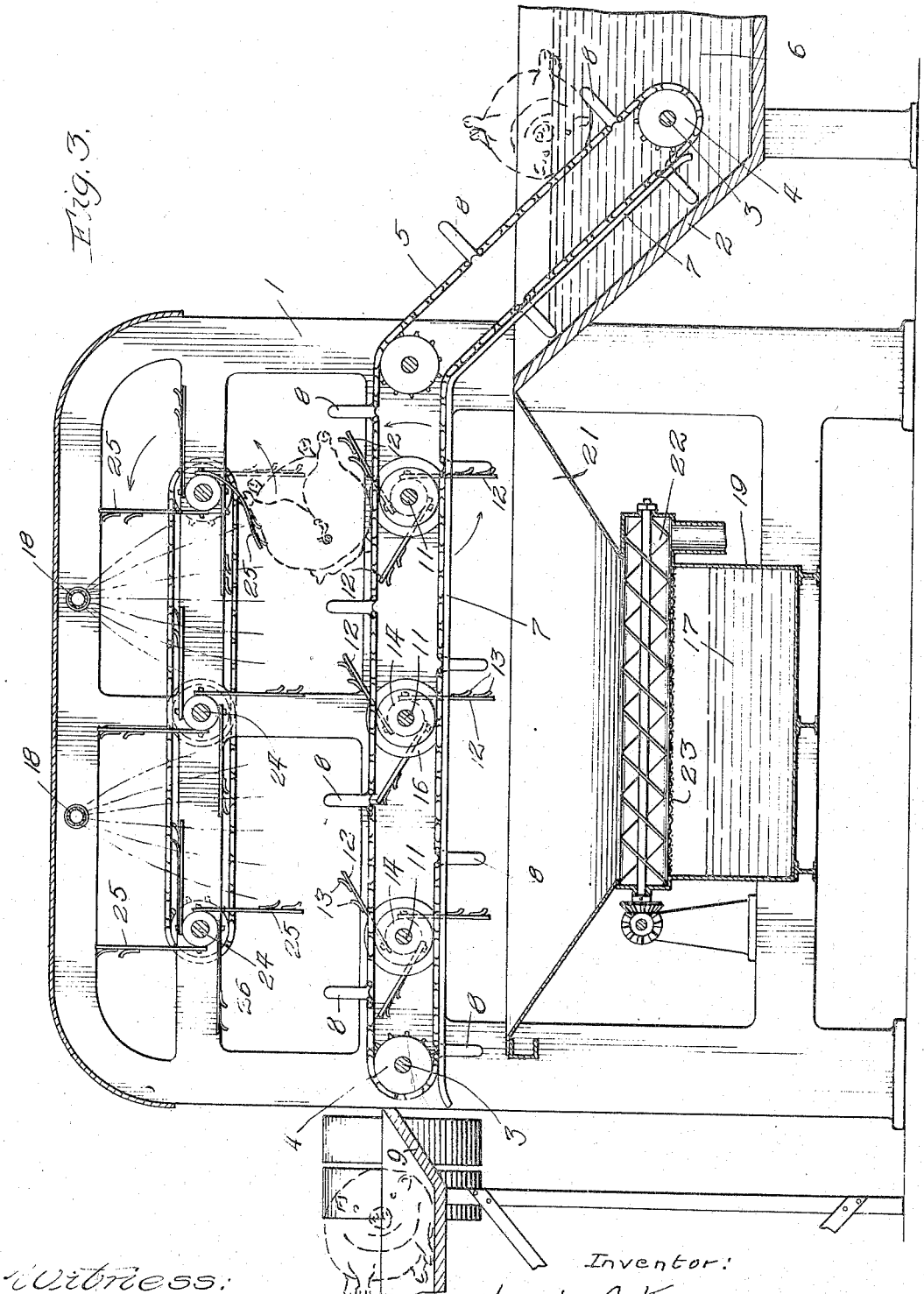

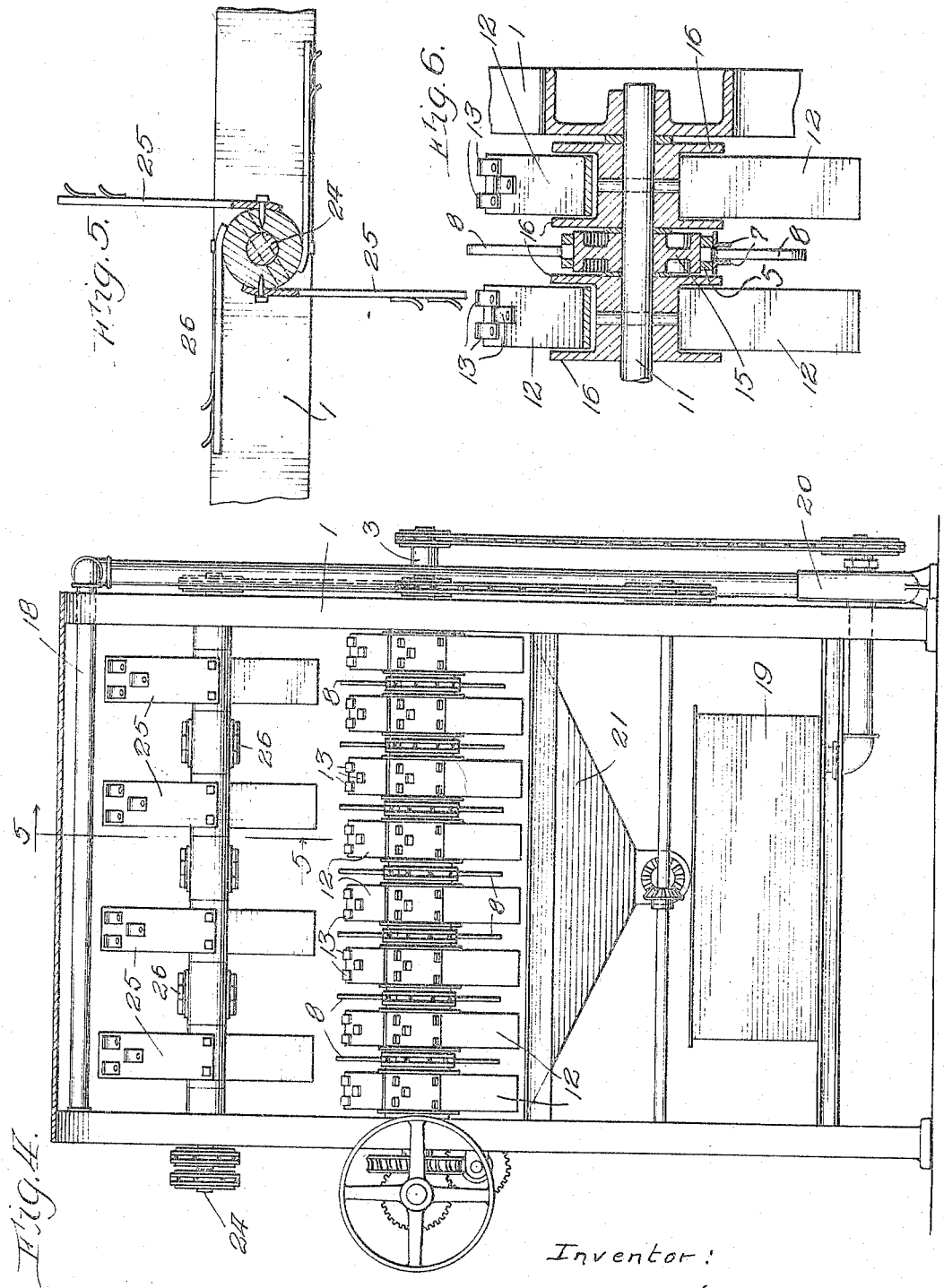

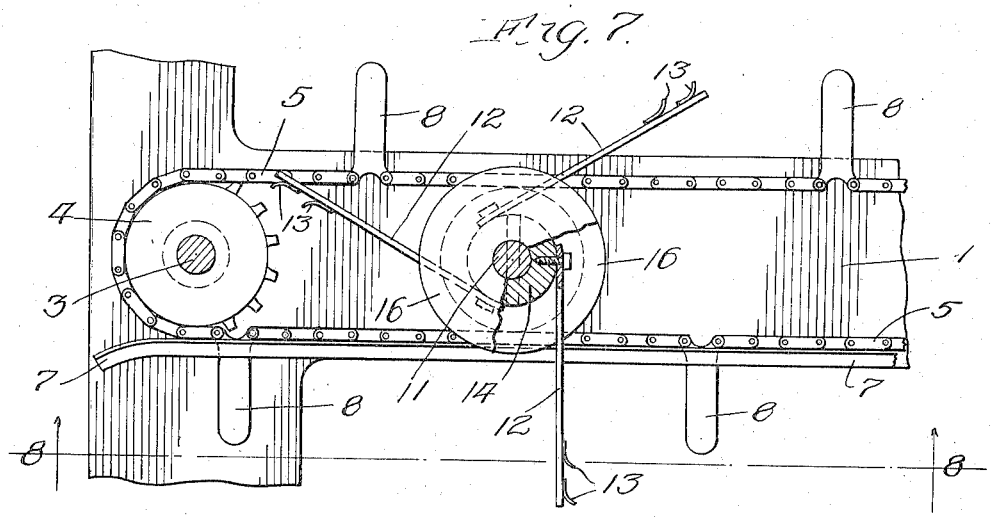
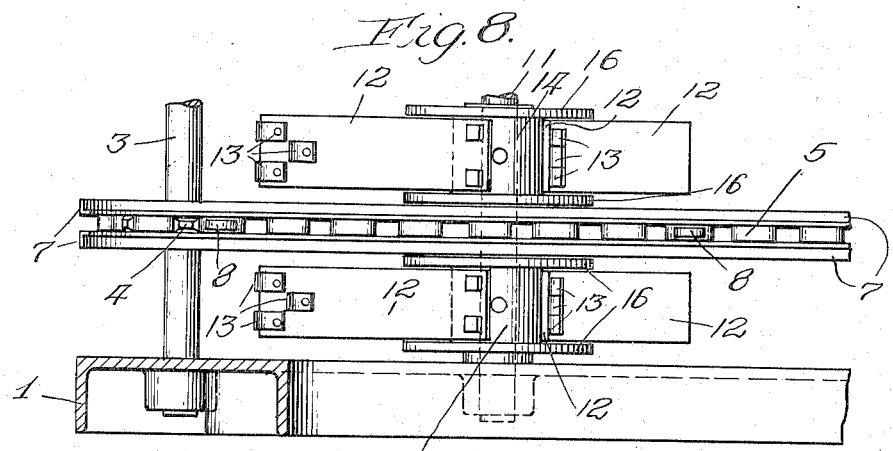
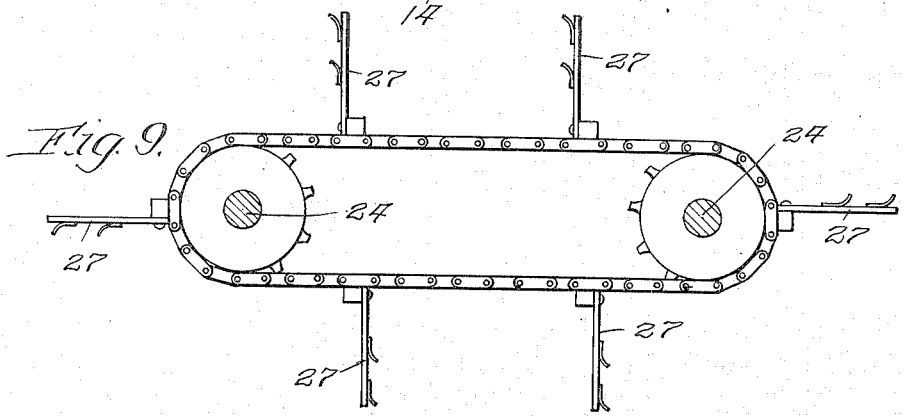

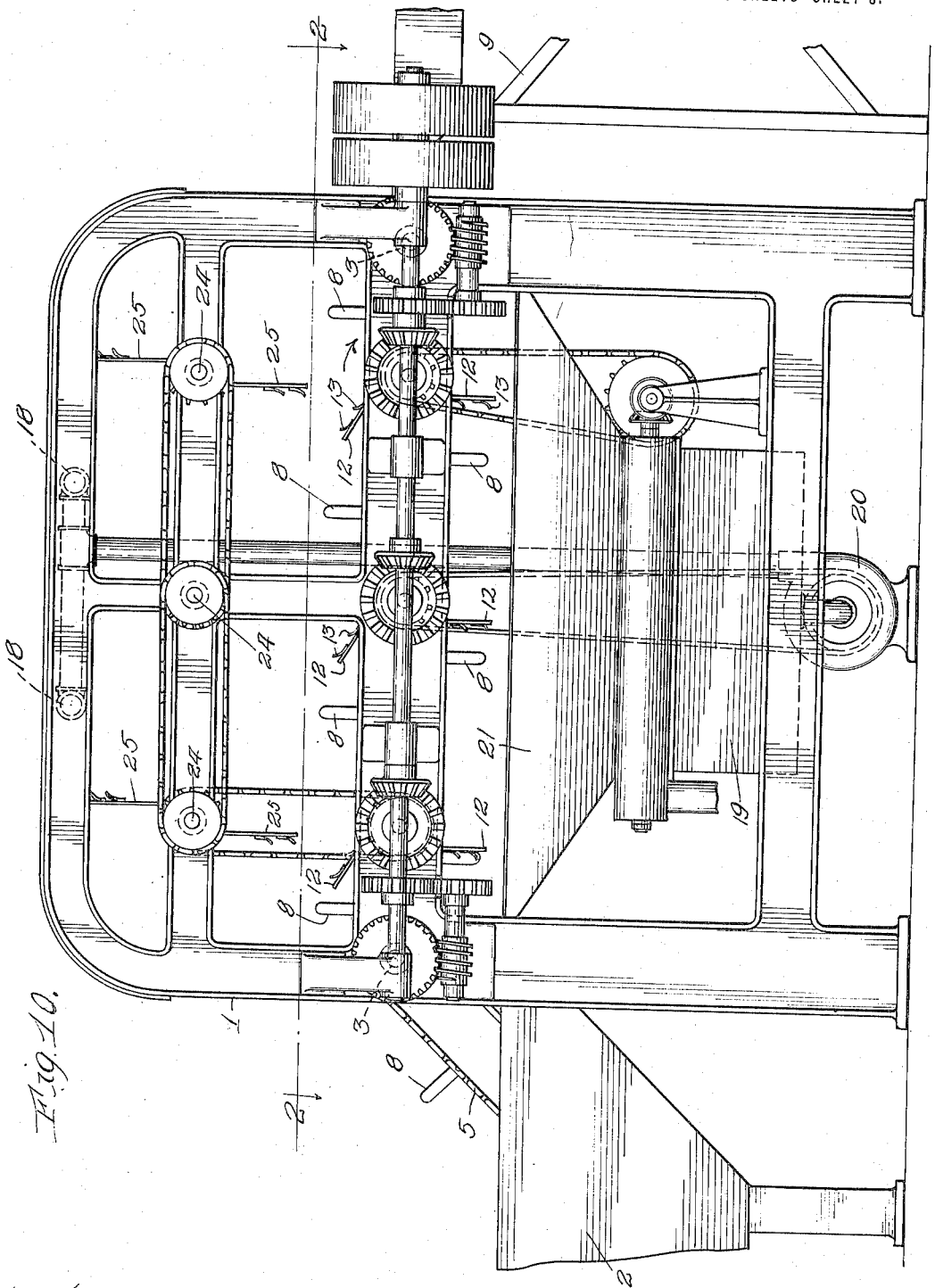

L. A. KRAMER.
HOG DEHAIRING AND SCRAPING MACHINE.
APPLICATION FILED JAN. 2, 1919.
1,325,893.
Patented Dec. 23, 1919.
7 SHEETS—SHEET 7.
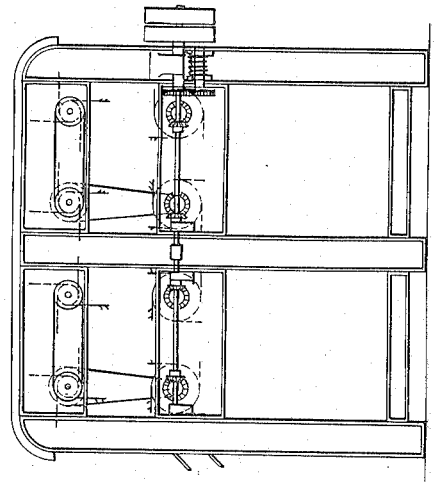
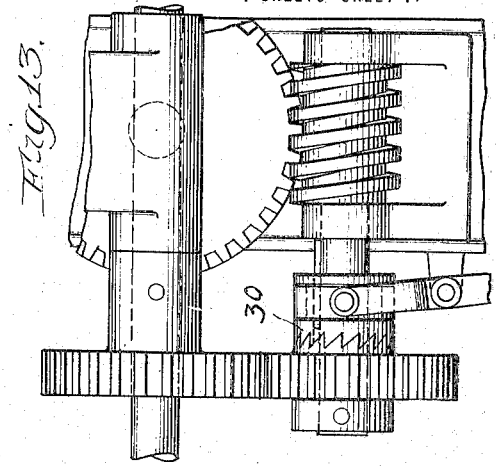
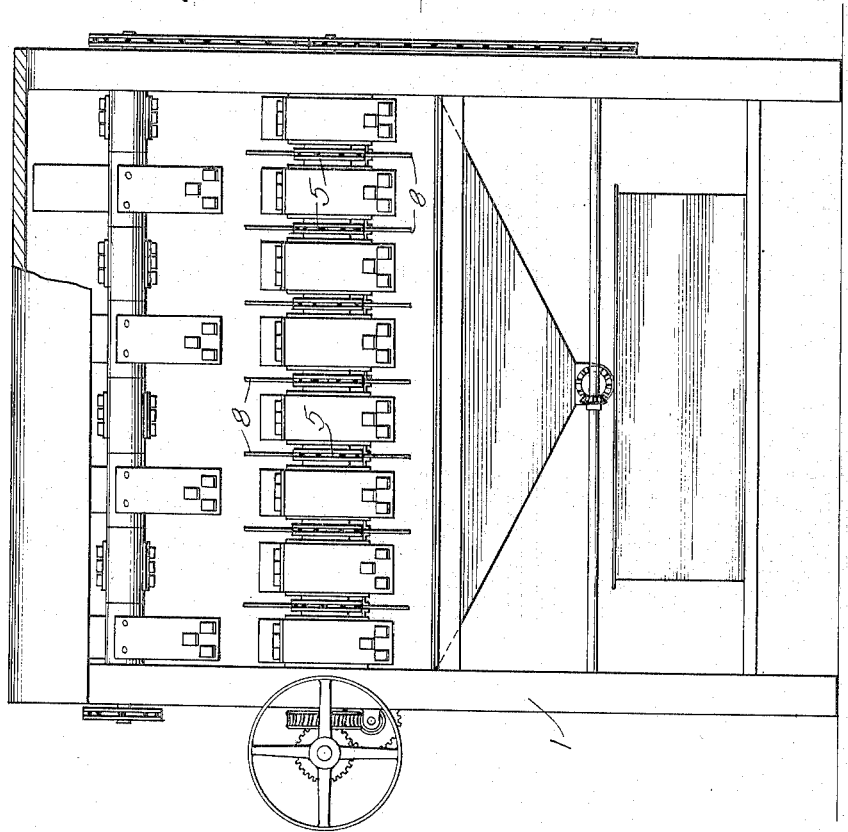
Witness:
W. L. Tarrington
Inventor:
Louis A. Kramer
by Albert Scheible
Attorney

UNITED STATES PATENT OFFICE.

LOUIS A. KRAMER, OF CHICAGO, ILLINOIS.

HOG DEHAIRING AND SCRAPING MACHINE.

1,325,893.  Specification of Letters Patent.  Patented Dec. 23, 1919.

Application filed January 2, 1919. Serial No. 269,286.

*To all whom it may concern:*

Be it known that I, LOUIS A. KRAMER, a citizen of the United States, residing at Chicago, in the county of Cook and State of Illinois, have invented certain new and useful Improvements in Hog Dehairing and Scraping Machines; and I do hereby declare the following to be a full, clear, and exact description of the invention, such as will enable others skilled in the art to which it appertains to make and use the same.

My invention relates to machines for dehairing, scraping and polishing carcasses; that is to say, to the class of machines most commonly sold in the form of hog dehairing and scraping machines. In U. S. Patent 1249776 issued to me on December 11, 1917, I have illustrated and described a machine of this class of which the desired operations are performed on the hog while the latter is being continuously and positively conveyed past a series of scraping and polishing members all located underneath the path through which the hog is conveyed. In one aspect, my present invention aims to provide a machine which will have greater operative capacity in proportion to the floor space occupied by the machine and the cost of the latter, and which will employ beaters operating in various directions upon the hog and hence more effective than when the beaters all operate in one and the same general direction.

In another aspect, my invention aims to provide various units for a machine of the class designated, which units can be combined in any desired arrangement, thereby affording a sectional construction which will reduce the number of parts to be carried in stock by the manufacturer and which will enable the initial purchaser of any given size of machines to add other sections for increasing the operating capacity as desired. In another aspect, my invention aims to provide a hog scraping machine in which the hog may be simultaneously acted upon by beaters disposed at opposite sides of the path through which the hog is conveyed, and in which the beaters will therefore coöperate in forcing the hog into effective relation to each other. In still another aspect, my invention aims to provide a hog dehairing machine in which the hog is successively subjected to the action of numerous beaters, and in which the conveying means are controlled separately from the beating means, so that the hog may either be passed at a substantially uniform rate past all of the beaters, or may be halted at any desired point in the machine for continued action upon it by adjacent beaters. Furthermore, my invention aims to provide a machine in which the hog is subjected partly to beaters operating in one direction and partly to beaters operating in another direction; in which some of the beaters operate at a higher speed than others, and in which the beaters disposed at one side of the path through which the hog travels traverse this path longitudinally, so as to operate on the hog even while the latter is in positions intermediate of the effective reach of beaters disposed at the opposite side of the path. My invention also aims to provide a novel mounting for beaters, and aims to accomplish further objects which will appear from the following specification and from the accompanying drawings. In the drawings, Figure 1 is an elevation of a machine embodying my invention and including three of the main sectional units.

Fig. 2 is a horizontal section through the same along the line 2—2 of Fig. 1.

Fig. 3 is an elevation of a non-sectional machine also embodying various features of my invention.

Fig 4 is a transverse vertical section through a machine embodying my invention and having the upper beaters mounted on shafts instead of on endless chains.

Fig 5 is a fragmentary enlarged section through Fig 4, along the line 5—5 showing the mounting of one set of the beater members.

Fig. 6 is an enlarged and fragmentary section taken longitudinally of one of the lower beater shafts of Fig. 4 and showing the arrangement of the beating members and of the auxiliary hog-lifting and hog-rotating collars.

Fig. 7 is an enlarged detail showing the mounting and drive for the upper beaters of Fig. 3.

Fig. 8 is a fragmentary bottom view of the same elements as Fig. 7.

Fig. 9 is a fragmentary view showing the mounting and the drive connections for the upper beaters of Fig. 1.

Fig. 10 is a rear view of the machine of Fig. 3.

Fig. 11 is an end view of the machine of Fig. 1, taken from the right hand end of the latter and having a portion of the roof or hood of the machine cut away to show the upper beaters.

Fig. 12 is an elevation of a machine similar to Fig. 1, but including only two of the main units.

Fig. 13 is an enlarged detail showing the clutch arrangement for controlling the operation of the conveyer in the machine of Fig. 1.

In the embodiment of the drawings, my invention consists essentially of a frame 1 and a scalding trough 2 supporting drive shafts 3, each of which shafts carries a plurality of spaced sprockets 4. The sprockets on the respective shafts are alined in rows extending longitudinally of the machine, and the sprockets on each shaft are intermeshed with conveyer chains 5 dipping into the water 6 within the trough 2 and guided on their lower stretch by guides 7. Each of the said chains carries a series of projecting arms 8, spaced by a distance corresponding roughly to the extreme diameter of the largest hog which the machine is expected to handle. Each such arm reaches out sufficiently far to engage a hog in the scalding trough when the hog is floated up against the chain as shown in Fig. 3, so that the continuous movement of the chain will carry the hog through the frame of the machine and drop it upon a chute 9 leading to the delivery board 10 as shown at the left of the machine in Fig. 3.

Mounted on shafts 11 also extending transversely of the frame of the machine are impact members, each of which as here shown consists of three flexible beaters 12 fitted respectively near their outer ends with a number of metal scrapers 13 and attached at their inner ends to collars 14. These beater shafts 11 also desirably carry auxiliary or idler sprockets 15 for supporting the upper stretches of the chains 5 and these sprockets are preferably spaced from the beaters by flanges 16 of such diameter as to project upward beyond the tops of the chains and of the beater collars 14. With the parts thus arranged, it will be obvious from Fig. 3 that a hog floated up to the chain will be carried up on the incline of the conveyer and through the machine past the successive shafts 3. As soon as the hog comes within range of the tips of the beaters, which are carried by rapidly rotating shafts, the metal scrapers on these beaters will begin to dehair the hog and at the same time will tend to rotate the hog. More particularly, the beaters shown at the right hand end of the machine in Fig. 3 will at first tend to slide the hog on the chains toward the left and against the arms of stops 8$^a$; then, when the hog is approximately over the beater shaft, the beaters will tend to raise the hog off the chains, thereby enabling the rotating effect of the impact of the beaters to turn the hog more freely; and finally, will give taps of increasing gentleness to the hog as the latter moves out of range of the beaters and rolls against the arms 8$^b$. Thus, the lifting action of the beaters will aid the turning action of the same in rotating the hog so as to present continually changing surface portions to the scrapers, while the excess of width of the frame over the length of the hog will permit a limited endwise motion of the latter which also aids in carrying the surface portions engaged by the beaters. Moreover, whenever the hog comes directly over one of the shafts, the projecting flanges 16 will engage the hog to lift the latter clear of the chains, in doing which the hog will be rotated both by the said flanges (which rotate with the shafts 11) and by the action of the beaters. Consequently, by employing these power-rotated projecting flanges as auxiliaries to the beaters, I am able to impart an unusual amount of movement, rotational and otherwise, to the hog while within the range of each set of beaters. However, since each hog can only move back and forth between the adjacent sets of spacer arms 8, I can positively control the rate at which the hog passes through the machine as a whole, as well as the amount of beating to which it is subjected during this passage, it being obvious that both can be effectively carried by simply varying the speed at which the shafts 3 and 11 are driven.

To remove the hairs and other particles loosened by the beaters and scrapers, I desirably provide sprays of water 17 issuing from perforated pipes 18 into which it is pumped from a drain tank 19 by a power-driven pump 20. This tank is preferably mounted within the frame of the machine under a funnel 21 which catches all of the drippings and scrapings from the hogs and from which funnel the hair is removed by a screw conveyer 22, while the water drains through a screen 23 into the tank 19.

While the machine as thus described will successively subject the hogs or other carcasses to the action of a number of sets of beaters and hence will afford a compact means for rapidly dehairing the hogs fed to it, I desirably increase its operating capacity still further by also providing auxiliary beaters disposed above the path in which the hogs travel through the machine. For this purpose I operatively connect a second series of beater shafts 24 to the driving mechanism of my machine and equip these shafts with beaters 25 and 26, which beaters desirably are arranged in rotationally staggered relation with respect to the axis of the shafts, as shown for example in Figs. 4 and 10. Consequently, each hog while traversing the machine will be acted upon not only by the lower beaters which desirably move both upwardly and forwardly of the machine across the path traversed by the hogs, but also by the upper beaters which strike the hogs in a downward and rearward direction. Thus arranged, it will be evident from Fig. 3 that the upper and lower beaters will coöperate both in forcing the hogs toward each other and thereby increasing the effective blow of each, and in rotating the hog during this action, so that I can subject the hogs to a considerably increased amount of effective treatment and hence can correspondingly increase the operating capacity of a machine occupying a given floor space.

While the upper beaters may be mounted directly on the beater shafts 24 as shown in Fig. 5, I desirably mount them so that they will not only intermittently intercept the path through which the hog is conveyed, but will also travel along that path. Thus, Figs. 1, 9 and 10 show the upper beaters 27 mounted on endless chains extending lengthwise of the said path, thereby enabling these beaters to impact against the hog not only when the latter is approximately over one of the lower beaters, but also when the hog is in positions intermediate of the lower beaters and substantially out of reach of the latter. By this provision, I am able to increase the operating capacity of my machine over that which it would have if the beaters were all moved about stationary axes.

In order to secure a maximum effectiveness of the action of the set of beaters, I desirably proportion the driving mechanism so that the upper beaters (which do not tend to lift the hog and hence have lighter strains imposed upon them) operate at a relatively higher rate of speed than the lower beaters. I also desirably make the connections to the beaters in such a manner that a portion of the same will operate in the opposite directions from other beaters. This is easily accomplished with the sectional construction here illustrated, as the main drive shaft for the upper beaters can readily be built in sections coupled to each other by couplings 27, and transmission can be made from each section of the shaft to the upper beaters on the same unit through pinions 28 and beveled gears 29 by simply reversing the position of the pinion 28 with respect to the gear driven by the same, as shown in the middle and in the right hand section of Fig. 1, I reverse the drive for the upper beaters. Consequently, the hog passing through the machine of Fig. 1 from the scalding trough at the left of the latter will first pass through two sections in both of which the beaters operate in the same general direction, and will thereafter pass through the third section in which the beaters operate in the opposite direction. This opposite action enables the beating and scraping elements to reach portions of the hog which would not be effectively acted upon by any continued operation in one and the same direction, hence this provision enables me to secure a greater effectiveness in a given amount of time and with a given size of machine than would otherwise be possible.

To further increase the effectiveness of my machine and to avoid a waste of time in operating on a given hog or set of hogs, I also desirably provide means for disconnecting the conveyer from the driving mechanism, so that the conveying action may be halted at any desired point while continuing action of the beaters. For example, by providing a clutch 30 as shown more in detail in Fig. 13, I enable the operator to halt the conveying action at any desired point in any of the sections, thus affording added time for the operation on given hogs if this should seem desirable. Consequently, my machine may be built for entirely automatic action on the hogs as ordinarily slaughtered, and yet may instantly be operated semi-automatically to allow for any decided departures from the general average.

However, while I have pictured and described certain desirable embodiments of my invention, I do not wish to be limited to the construction and arrangement here disclosed, it being obvious that the same might be modified in many ways without departing from the spirit of my invention.

I claim as my invention:

1. In a hog scraping machine, means for continuously conveying a hog in a substantially horizontal path and in a direction transverse of the hog while permitting the hog to roll horizontally for a limited distance back and forth, and beater members disposed in pairs along the said path, with the members of each pair arranged for impacting simultaneously against the hog from above and below the said path.

2. In a hog scraping machine, means for continuously conveying a hog in a substantially horizontal path and in a direction transverse of the hog while permitting the hog to roll horizontally for a limited distance back and forth, and beater members disposed in pairs along the said path, with the members of each pair arranged for impacting simultaneously against the hog from above and below the said path, and with the upper beater member of each pair actuated at a different rate of speed from the lower one.

3. In a hog scraping machine, means for continuously conveying a hog in a substantially horizontal path and in a direction transverse of the hog while permitting the hog to roll horizontally for a limited distance back and forth, and beater members disposed in pairs along the said path, with the members of each pair arranged for impacting simultaneously against the hog from above and below the said path, and with certain pairs of beater members operating in opposite directions to other pairs of beater members.

4. In a hog scraping machine, means for continuously conveying a hog in a substantially horizontal path and in a direction transverse of the hog while permitting the hog to roll horizontally for a limited distance back and forth, beaters carried by rotating shafts disposed below and transverse of the said path, and auxiliary beaters carried by an endless chain disposed above the said path and arranged for moving longitudinally of the said path.

5. In a hog scraping machine, means for loosely supporting and conveying a hog along a given path transverse of the length of the hog and while maintaining the latter substantially horizontal, a moving endless chain disposed above the path, and beaters carried by the chain and projecting into the said path to impact against the hog while moving in the opposite direction from that in which the hog is being conveyed.

6. In a hog scraping machine, means for conveying hogs in a given path, two groups of shafts extending transversely of the said path and out of alinement with the latter, all of the shafts being parallel, and the two groups being respectively disposed above and below the said path, beaters driven by each shaft and disposed for intercepting the said path, and means for rotating the said shafts in such directions that the opposed beaters associated with the two groups of shafts will coöperate in rotating a hog passing along the said path between them.

7. In a hog scraping machine, a frame comprising a plurality of units, interconnected beater shafts mounted on each unit, beaters carried by the respective shaft, common means for rotating all of the said shafts, and means for successively conveying hogs through the said units and past all the said beaters.

8. In a hog scraping machine, a frame comprising a plurality of units, interconnected beater shafts mounted on each unit, beaters carried by the respective shaft, driving means arranged for rotating certain of the shafts in one direction and others thereof in the opposite direction, and means for successively conveying hogs through the said units and past all the said beaters.

9. In a hog scraping machine, means for conveying hogs along a given path, rotatable beater members consecutively disposed respectively above and below the said path and having portions intermittently intercepting the path, means for rotating the lower beater members and part of the upper beater members in one direction, and means for rotating the other beater members in the opposite direction.

10. In a hog scraping machine, a plurality of parallel shafts, means for moving a hog successively above and past the said shafts, separate means carried by each shaft for scraping and lifting the hog when passing over the shaft, and auxiliary beaters so disposed with respect to the said shafts that the hog will be approached to the auxiliary beaters by the said lifting.

11. In a hog scraping machine, means for conveying a hog along a given path, a moving endless chain disposed longitudinally of the path, and beaters carried by the chain and projecting into the said path.

12. In a hog scraping machine, means for causing a hog to traverse a given path while extending transversely of the path, and beaters arranged for intermittently intercepting the said path and for moving bodily along the said path in a direction opposite to that in which the hog traverses the path.

13. In a hog scraping machine, means for conveying a hog along a given path, while extending transversely of the latter, a plurality of beater members transverse of the path and consecutively adapted for intercepting the latter, means for continuously operating the beater members; and separately controlled means for operating the conveying means, thereby permitting the hog to be substantially halted at any desired point of the said path while still subjecting it to the action of the beater members.

14. The method of dehairing hogs which includes conveying a hog transversely of its length in a given path and subjecting the hog during its conveying to beaters operating in the general direction in which the hog is conveyed and thereafter to beaters operating in an opposite direction.

15. The method of dehairing hogs which includes conveying a hog transversely of its length in a given path and subjecting the hog during its conveying consecutively to beaters operating at relatively different effective rates.

Signed at Chicago, December 31st, 1918.

LOUIS A. KRAMER.